US008085800B2

(12) United States Patent
Naven et al.

(10) Patent No.: US 8,085,800 B2
(45) Date of Patent: Dec. 27, 2011

(54) QUEUING METHOD

(75) Inventors: Finbar Naven, Cheshire (GB); Stephen John Marshall, Lancashire (GB)

(73) Assignee: Virtensys Ltd., Cheshire (GB)

( * ) Notice: Subject to any disclaimer, the term of this patent is extended or adjusted under 35 U.S.C. 154(b) by 238 days.

(21) Appl. No.: 12/211,192

(22) Filed: Sep. 16, 2008

(65) Prior Publication Data

US 2009/0086747 A1 Apr. 2, 2009

Related U.S. Application Data

(60) Provisional application No. 60/973,242, filed on Sep. 18, 2007.

(30) Foreign Application Priority Data

Sep. 18, 2007 (GB) .................................. 0718145.6

(51) Int. Cl.
H04L 12/56 (2006.01)
(52) U.S. Cl. ....................................................... 370/412
(58) Field of Classification Search .................. None
See application file for complete search history.

(56) References Cited

U.S. PATENT DOCUMENTS

| | | | |
|---|---|---|---|
| 6,356,212 B1 * | 3/2002 | Lyons et al. ..................... 341/60 |
| 6,754,215 B1 | 6/2004 | Arikawa et al. | |
| 2002/0126673 A1 | 9/2002 | Dagli et al. | |
| 2002/0141454 A1 * | 10/2002 | Muniere ........................ 370/535 |
| 2002/0176358 A1 | 11/2002 | Assa et al. | |
| 2003/0086431 A1 | 5/2003 | Wu et al. | |
| 2003/0133466 A1 * | 7/2003 | Shimonishi ................... 370/412 |
| 2005/0030963 A1 * | 2/2005 | Solomon et al. .............. 370/428 |
| 2006/0230195 A1 * | 10/2006 | Kootstra et al. ................. 710/39 |
| 2006/0239194 A1 * | 10/2006 | Chapell ......................... 370/235 |
| 2006/0268692 A1 | 11/2006 | Wright et al. | |
| 2007/0277064 A1 * | 11/2007 | Chen ............................. 714/701 |

FOREIGN PATENT DOCUMENTS

| | | |
|---|---|---|
| GB | 2 331 676 A | 5/1999 |
| WO | WO 2006/051465 | 5/2006 |

OTHER PUBLICATIONS

International Search Report and the Written Opinion for PCT/GB2008/003043, dated Dec. 22, 2008, (15 pages).
Search Report for GB0718145.6, dated Dec. 13, 2007, (2 pages).

\* cited by examiner

Primary Examiner — Yong Zhou
(74) Attorney, Agent, or Firm — Barnes & Thornburg LLP

(57) ABSTRACT

A method of queuing data packets, said data packets comprising data packets of a first packet type and data packets of a second packet type. The method comprises grouping received packets of said first and second packet types into an ordered series of groups, each group comprising at least one packet, maintaining a group counter indicating the number of groups at the beginning of the series of groups comprising only packets of the second packet type, and transmitting a packet. A packet of the second packet type is available for transmission if but only if the group counter is indicative that the number of groups at the beginning of the series of groups comprising only packets of the second packet type is greater than zero.

44 Claims, 11 Drawing Sheets

Fig. 2

| | Group Counter = 1 | | | | | | | | | | |
|---|---|---|---|---|---|---|---|---|---|---|---|
| 6 — Ordered queue | $O_{12}$ | $O_{11}$ | | $O_9$ | | | $O_5$ | | $O_3$ | $O_2$ | |
| 7 — Bypassable queue | | | $B_{10}$ | | $B_8$ | $B_7$ | $B_6$ | | $B_4$ | | | $B_1$ | $B_0$ |
| 8 — Group Tag | 0 | | 1 | | 0 | | | 1 | | | 0 |

Fig. 3

| | Group Counter = 0 | | | | | | | | | |
|---|---|---|---|---|---|---|---|---|---|---|
| 6 — Ordered queue | $O_{12}$ | $O_{11}$ | | $O_9$ | | | $O_5$ | | $O_3$ | $O_2$ |
| 7 — Bypassable queue | | | $B_{10}$ | | $B_8$ | $B_7$ | $B_6$ | | $B_4$ | |
| 8 — Group Tag | 0 | | 1 | | 0 | | | 1 | | |

Fig. 4

| | Group Counter = 1 | | | | | | | |
|---|---|---|---|---|---|---|---|---|
| 6 — Ordered queue | $O_{12}$ | $O_{11}$ | | $O_9$ | | | $O_5$ | |
| 7 — Bypassable queue | | | $B_{10}$ | | $B_8$ | $B_7$ | $B_6$ | | $B_4$ |
| 8 — Group Tag | 0 | | 1 | | 0 | | | 1 |

Fig. 5

| | Group Counter = 2 | | | | | | | |
|---|---|---|---|---|---|---|---|---|
| 6 — Ordered queue | $O_{12}$ | $O_{11}$ | | $O_9$ | | | | |
| 7 — Bypassable queue | | | $B_{10}$ | | $B_8$ | $B_7$ | $B_6$ | $B_4$ |
| 8 — Group Tag | 0 | | 1 | | 0 | | | 1 |

Fig. 6

| | Group Counter = 1 | | | | | | |
|---|---|---|---|---|---|---|---|
| 6 — Ordered queue | $O_{12}$ | $O_{11}$ | | $O_9$ | | | |
| 7 — Bypassable queue | | | $B_{10}$ | | $B_8$ | $B_7$ | $B_6$ |
| 8 — Group Tag | 0 | | 1 | | 0 | | |

| Group Counter = 0 | | | | |
|---|---|---|---|---|
| Ordered queue | $O_{12}$ | $O_{11}$ | | $O_9$ |
| Bypassable queue | | | $B_{10}$ | |
| Group Tag | 0 | | | 1 |

Fig. 7

| Group Counter = 0  Last Packet Type = Ordered  Last Packet Tag = 0 | | | | |
|---|---|---|---|---|
| Ordered queue | $O_{12}$ | $O_{11}$ | | $O_9$ |
| Bypassable queue | | | $B_{10}$ | |
| Group Tag | 0 | | | 1 |

Fig. 8

| Group Counter = 1  Last Packet Type = Ordered  Last Packet Tag = 0 | | | |
|---|---|---|---|
| Ordered queue | $O_{12}$ | $O_{11}$ | |
| Bypassable queue | | | $B_{10}$ |
| Group Tag | 0 | | 1 |

Fig. 9

| Group Counter = 1  Last Packet Type = Bypassable  Last Packet Tag = 1 | |
|---|---|
| Ordered queue | |
| Bypassable queue | $B_{10}$ |
| Group Tag | 1 |

Fig.10

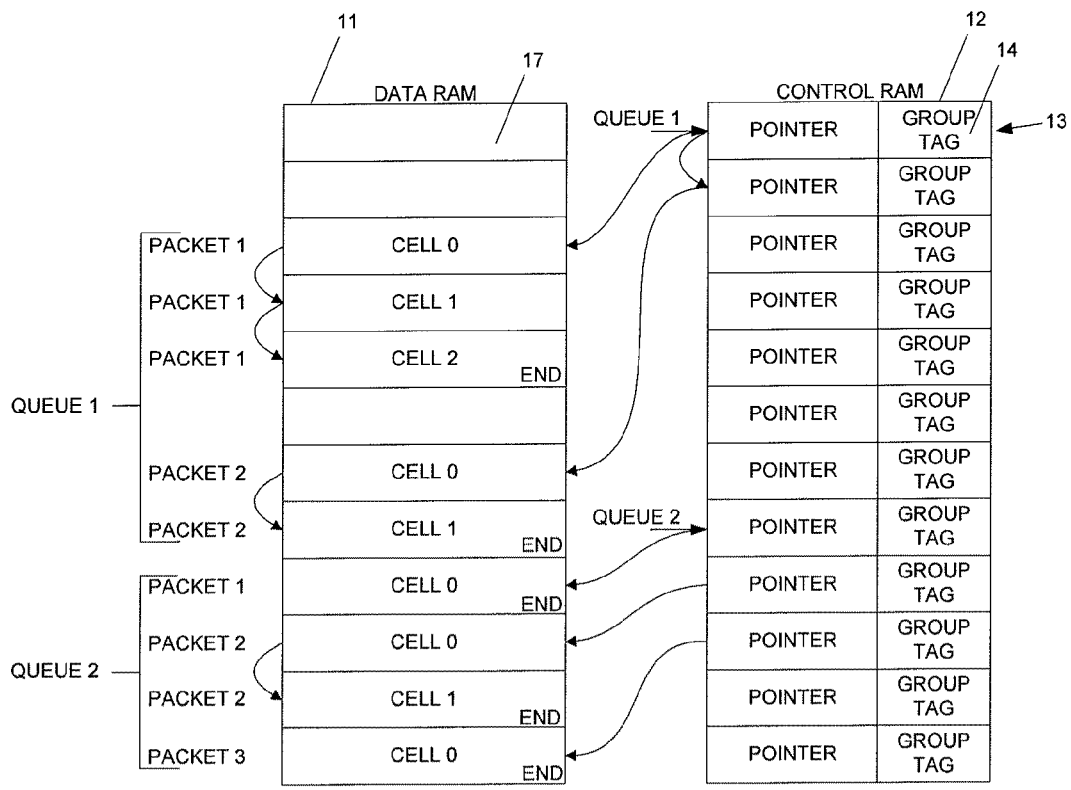
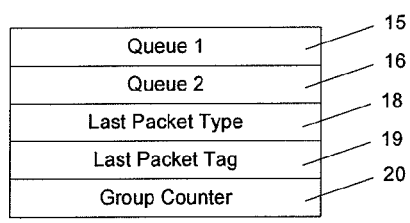
Fig. 11

| Group Counter = 0 |||||||||||
|---|---|---|---|---|---|---|---|---|---|---|
| Ordered queue | O₉ | O₈ |  | O₆ |  |  |  | O₂ |  | O₀ |
| Bypassable queue |  |  | B₇ |  | B₅ | B₄ | B₃ |  | B₁ |  |
| Group Tag | 0 || 1 || 0 ||| 1 ||

Fig. 14

| Group Counter = 0 |||||||||
|---|---|---|---|---|---|---|---|---|
| Ordered queue | O₉ | O₈ |  |  |  |  |  | O₆ |
| Bypassable queue |  |  | B₇ | B₅ | B₄ | B₃ | B₁ |  |
| Group Tag | 0 | 1 || 0 || 1 |||

Fig. 15

| Group Counter = 1 |||||||
|---|---|---|---|---|---|---|
| Ordered queue | O₉ | O₈ |  |  |  |  |  |
| Bypassable queue |  |  | B₇ | B₅ | B₄ | B₃ | B₁ |
| Group Tag | 0 | 1 | 0 || 1 |||

| | Group Counter = 0 | | | | | |
|---|---|---|---|---|---|---|
| Ordered queue | | | | | $O_9$ | $O_8$ |
| Bypassable queue | $B_7$ | $B_5$ | $B_4$ | $B_3$ | | |
| Group Tag | 1 | | 0 | | | |

6 — Ordered queue
7 — Bypassable queue
8 — Group Tag
9 — Group Counter

Fig. 18

| | Group Counter = 0 | | | | | | | | | |
|---|---|---|---|---|---|---|---|---|---|---|
| Ordered queue | $O_{13}$ | $O_{12}$ | | $O_{10}$ | | | $O_6$ | | $O_4$ | $O_3$ | | $O_0$ |
| Bypassable queue | | | $B_{11}$ | | $B_9$ | $B_8$ | $B_7$ | | $B_5$ | | | $B_2$ | $B_1$ |
| Group Tag | 0 | | 3 | | | 2 | | | 1 | | | 0 |

Fig. 19

| | Group Counter = 2 | | | | | | | | |
|---|---|---|---|---|---|---|---|---|---|
| Ordered queue | $O_{13}$ | $O_{12}$ | | $O_{10}$ | | | $O_6$ | | | |
| Bypassable queue | | | $B_{11}$ | | $B_9$ | $B_8$ | $B_7$ | | $B_5$ | $B_2$ | $B_1$ |
| Group Tag | 0 | | 3 | | 2 | | | 1 | | 0 |

Fig. 20

| | 13 | 12 | 11 | 10 | 9 | 8 | 7 | 6 | 5 | 4 | 3 | 2 | 1 | 0 |
|---|---|---|---|---|---|---|---|---|---|---|---|---|---|---|
| 30 — Posted queue | $P_{13}$ | | $P_{11}$ | | | $P_8$ | | $P_6$ | | $P_4$ | | | | $P_0$ |
| 31 — Completion queue | | | | | $C_9$ | | $C_7$ | | | | $C_3$ | | $C_1$ | |
| 32 — Non-posted queue | | $N_{12}$ | | $N_{10}$ | | | | | $N_5$ | | | $N_2$ | | |
| 33 — PC Group Tag | | 3 | | | 2 | | | 1 | | | 0 | | | |
| 34 — PC Group Counter | | | | | | | | | | | | | | 0 |
| 35 — PN Group Tag | 0 | | 3 | | | 2 | | | 1 | | | 0 | | |
| 36 — PN Group Counter | | | | | | | | | | | | | | 0 |
| 37 — CN Group Tag | | | 2 | | | | | 1 | | | | 0 | | |
| 38 — CN Group Counter | | | | | | | | | | | | | | 0 |

Fig. 21

| | 13 | 12 | 11 | 10 | 9 | 8 | 7 | 6 | 5 | 4 | 3 | 2 | 1 | 0 |
|---|---|---|---|---|---|---|---|---|---|---|---|---|---|---|
| 30 — Posted queue | $P_{13}$ | | $P_{11}$ | | | $P_8$ | | $P_6$ | | $P_4$ | | | | |
| 31 — Completion queue | | | | | $C_9$ | | $C_7$ | | | | $C_3$ | | $C_1$ | |
| 32 — Non-posted queue | | $N_{12}$ | | $N_{10}$ | | | | | $N_5$ | | | $N_2$ | | |
| 33 — PC Group Tag | | 3 | | | 2 | | | 1 | | | 0 | | | |
| 34 — PC Group Counter | | | | | | | | | | | | | | 1 |
| 35 — PN Group Tag | 0 | | 3 | | | 2 | | | 1 | | | 0 | | |
| 36 — PN Group Counter | | | | | | | | | | | | | | 1 |
| 37 — CN Group Tag | | | 2 | | | | | 1 | | | | 0 | | |
| 38 — CN Group Counter | | | | | | | | | | | | | | 0 |

Fig. 22

| | | | | | | | | | | | |
|---|---|---|---|---|---|---|---|---|---|---|---|
| 30 | Posted queue | $P_{13}$ | | $P_{11}$ | | | $P_8$ | | $P_6$ | | $P_4$ | |
| 31 | Completion queue | | | | | $C_9$ | | $C_7$ | | | $C_3$ | |
| 32 | Non-posted queue | | $N_{12}$ | | $N_{10}$ | | | | $N_5$ | | | $N_2$ |

| | | | | | |
|---|---|---|---|---|---|
| 33 | PC Group Tag | 3 | 2 | 1 | 0 |
| 34 | PC Group Counter | | | | 1 |
| 35 | PN Group Tag | 0 | 3 | 2 | 1 | 0 |
| | PN Group Counter | | | | | 1 |
| | CN Group Tag | | 2 | | 1 | 0 |
| | CN Group Counter | | | | | 1 |

Fig. 23

| | | | | | | | | | | | |
|---|---|---|---|---|---|---|---|---|---|---|---|
| 30 | Posted queue | $P_{13}$ | | $P_{11}$ | | | $P_8$ | | $P_6$ | | $P_4$ | |
| 31 | Completion queue | | | | | $C_9$ | | $C_7$ | | | $C_3$ | |
| 32 | Non-posted queue | | $N_{12}$ | | $N_{10}$ | | | | $N_5$ | | | |

| | | | | | |
|---|---|---|---|---|---|
| 33 | PC Group Tag | 3 | 2 | 1 | 0 |
| 34 | PC Group Counter | | | | 1 |
| 35 | PN Group Tag | 0 | 3 | 2 | 1 | 0 |
| 36 | PN Group Counter | | | | | 0 |
| 37 | CN Group Tag | | 2 | | 1 | |
| 38 | CN Group Counter | | | | | 0 |

| | | |
|---|---|---|
| 30 — Posted queue | | |
| 31 — Completion queue | | |
| 32 — Non-posted queue | | |
| 33 — PC Group Tag | 3 | |
| 34 — PC Group Counter | 0 | |
| 35 — PN Group Tag | 0 | |
| 36 — PN Group Counter | 0 | |
| 37 — CN Group Tag | 2 | |
| 38 — CN Group Counter | 0 | |

Fig. 24

| | | |
|---|---|---|
| 30 — Posted queue | | |
| 31 — Completion queue | | |
| 32 — Non-posted queue | $N_{14}$ | |
| 33 — PC Group Tag | 3 | |
| 34 — PC Group Counter | 0 | |
| 35 — PN Group Tag | 0 | |
| 36 — PN Group Counter | 1 | |
| 37 — CN Group Tag | 2 | |
| 38 — CN Group Counter | 1 | |

Fig. 25

| | | |
|---|---|---|
| 30 — Posted queue | | |
| 31 — Completion queue | $C_{15}$ | |
| 32 — Non-posted queue | | $N_{14}$ |
| 33 — PC Group Tag | 3 | |
| 34 — PC Group Counter | | 1 |
| 35 — PN Group Tag | 0 | |
| 36 — PN Group Counter | | 1 |
| 37 — CN Group Tag | 3 | 2 |
| 38 — CN Group Counter | | 1 |

Fig. 26

| | | | |
|---|---|---|---|
| 30 — Posted queue | | | |
| 31 — Completion queue | | $C_{15}$ | |
| 32 — Non-posted queue | $N_{16}$ | | $N_{14}$ |
| 33 — PC Group Tag | 3 | | |
| 34 — PC Group Counter | | | 1 |
| 35 — PN Group Tag | 0 | | |
| 36 — PN Group Counter | | | 1 |
| 37 — CN Group Tag | 3 | 2 | |
| 38 — CN Group Counter | | | 1 |

Fig. 27

| | | | |
|---|---|---|---|
| 30 — Posted queue | $P_{17}$ | | |
| 31 — Completion queue | | $C_{15}$ | |
| 32 — Non-posted queue | | $N_{16}$ | $N_{14}$ |
| 33 — PC Group Tag | 0 | 3 | |
| 34 — PC Group Counter | | | 1 |
| 35 — PN Group Tag | 1 | 0 | |
| 36 — PN Group Counter | | | 1 |
| 37 — CN Group Tag | | 3 | 2 |
| 38 — CN Group Counter | | | 1 |

Fig. 28

QUEUING METHOD

CROSS REFERENCE TO RELATED APPLICATIONS

The present application claims priority, under 35 U.S.C. §119(a), to British Patent Application No. 0718145.6, filed Sep. 18, 2007, and claims the benefit under 35 U.S.C. §119(e) of U.S. Provisional Application No. 60/973,242, filed Sep. 18, 2007, both of which are hereby expressly incorporated by reference in their entirety.

BACKGROUND OF THE INVENTION

The present invention relates to a method of queuing data packets. More particularly, but not exclusively, the present invention relates to a method of queuing data packets where the data packets comprise packets of both a first and a second type.

In computer networks data packets are frequently queued before onwards transmission in order to prevent network links from being overloaded. For instance, at a network router packets must be queued until there is available credit on an onwards network link to allow a packet to be transmitted. In conventional computer networks it is known to have different packet types with differing requirements for queuing. In particular, it is known to have two different packet types where a first packet type is of a relatively higher priority for onwards transmission.

In such a computer network a bypass capable queue may be implemented for queuing unpredictable sequences of two distinct packet types. Packets of the first type must be transmitted from the queue in order, but may overtake packets of the second type if credit for the second type is not available. Packets of the second type must also be transmitted from the queue in order, but may not overtake packets of the first type.

Before either packet type can be transmitted sufficient credit for that packet must be available on the onwards network link. A packet may only be transmitted if the router or other network element identifies that sufficient credit for that packet type is available.

It is known to implement a bypass capable queue by providing a single queue of data packets with links between packets within the queue of the same packet type, and between packet types. The links may take the form of two pointers stored alongside each packet pointing to the next packet within the queue of the same packet type, and a group of packets of the other type. When a packet is scheduled for transmission the pointers must be individually updated. This is a particularly complex process when a packet of the first packet type which is the last packet in a group of type 1 packets overtakes a packet of the second packet type. Furthermore, as well as the pointer arithmetic being computationally expensive each time a packet is transmitted, the process is also prone to errors. If a fault causes a pointer to become corrupted then it can be difficult to re-establish the bypass capable queue. Known bypass capable queues based upon pointers to the next packet of a given packet type require significant processing each time a packet is transmitted.

An alternative approach to implementing a bypass capable queue is to store each received packet with a time stamp and an indication of the type of packet. When determining which packet to transmit, the packet timestamps and packet types for packets can be compared to determine the relative order packets arrived in and where packets of each packet type appear within the queue. Again this known approach is computationally expensive. A further problem of time stamping is that tracking the relative order of timestamps can become complex when the timestamp wraps around (for instance, from 99 to 0).

It is known to implement a bypass capable queue with separate queues for each packet type. However, in such a known bypass capable queue, time stamping or some alternative form of linkage between the separate packet queues is still required to preserve the relative packet ordering.

BRIEF SUMMARY OF THE INVENTION

It is an object of embodiments of the present invention to obviate or mitigate one or more of the problems of the prior art, whether identified herein or elsewhere.

According to a first aspect of the present invention there is provided a method of queuing data packets, said data packets comprising data packets of a first packet type and data packets of a second packet type, the method comprising: grouping received packets into an ordered series of groups, each group containing at least one packet; maintaining a group counter indicating the number of groups at the beginning of the series of groups comprising only packets of the second packet type; and transmitting a packet; wherein a packet of the second packet type is available for transmission if but only if the group counter is indicative that the number of groups at the beginning of the series of groups comprising only packets of the second packet type is greater than zero.

An advantage of the first aspect of the present invention is that it implements a bypass capable queue which preserves the relative ordering of the first and second packet types and allows first packet type packets to overtake second packet type packets. The overhead of complex pointer manipulations or time stamping encountered by known methods of implementing a bypass capable queue are avoided.

Transmitting a packet may comprise transmitting either the first received packet of the first packet type or the first received packet of the second packet type.

Maintaining a group counter may comprise maintaining a group counter equal to the number of groups at the beginning of the series of groups comprising only packets of the second packet type.

The method may further comprise: maintaining a first queue of received packets of the first packet type; and maintaining a second queue of received packets of the second packet type; wherein transmitting a packet comprises transmitting a packet from either the first or the second queue.

A packet of the first packet type or a packet of the second packet type may only be available for transmission if there is sufficient transmit credit for that packet type.

Each group may contain packets of the first packet type and packets of the second packet type.

Grouping received packets into an ordered series of groups may comprise assigning a group tag to each received packet, each packet within a single group being assigned the same group tag.

Packets within adjacent groups in the ordered series of groups may be assigned different group tags.

The group tag assigned to a received packet may be generated from the current state of a cyclic counter. The method may further comprise changing the value of the cyclic counter for each new group.

Changing the value of the cyclic counter for each new group may comprise changing the value of the cyclic counter when a packet of the first packet type is received if the previous received packet was a packet of the second packet type, such that the received packet is assigned a different group tag to the group tag assigned to the previous received packet. Said changing may comprise incrementing the value of the cyclic counter.

The method may further comprise changing the value of the group counter if a transmitted packet is of the first packet type and has a different group tag to the next packet of the first packet type.

Said changing may comprise changing the value of the group counter by the modulus of the difference between the group tag of the transmitted packet and the group tag of the next packet of the first packet type. Said changing may comprise incrementing the value of the group counter.

The method may further comprise changing the value of the group counter if a transmitted packet is of the second packet type and has a different group tag to the next packet of the second packet type.

Said changing of the value of the group counter may comprise changing the value of the group counter by the modulus of the difference between the group tag of the transmitted packet and the group tag of the next packet of the second packet type. Said changing may comprise decrementing the value of the group counter.

Said data packets may further comprise data packets of a third packet type, the method further comprising: grouping received packets into a second ordered series of groups, in which each group contains only packets of the first packet type and packets of the third packet type; and maintaining a second group counter indicating the number of groups at the beginning of the second series of groups comprising only packets of the third packet type; wherein a packet of the third packet type is available for transmission if but only if the second group counter is indicative that the number of groups at the beginning of the second series of groups comprising only packets of the third packet type is greater than zero.

The method may further comprising: grouping received packets into a third ordered series of groups, in which each group contains packets of the second packet type and packets of the third packet type; and maintaining a third group counter indicating the number of groups at the beginning of the third series of groups comprising only packets of the third packet type; wherein a packet of the third packet type is available for transmission if but only if the third group counter is indicative that the number of groups at the beginning of the third series of groups comprising only packets of the third packet type is greater than zero.

According to a second aspect of the present invention there is provided a carrier medium carrying computer readable code for controlling a computer to carry out the above method.

According to a third aspect of the present invention there is provided a computer apparatus for queuing data packets, the apparatus comprising: a program memory storing processor readable instructions; and a processor configured to read and execute instructions stored in said program memory; wherein the processor readable instructions comprise instructions controlling the processor to carry out the above method.

According to a fourth aspect of the present invention there is provided an apparatus for queuing data packets, said data packets comprising data packets of a first packet type and data packets of a second packet type, the apparatus comprising: a grouping mechanism arranged to group received packets into an ordered series of groups, each group containing at least one packet of any packet type; a group counter indicating the number of groups at the beginning of the series of groups comprising only packets of the second packet type; and a transmitter arranged to transmit a packet; wherein a packet of the second packet type is available for transmission if but only if the group counter stores a value indicative that the number of groups at the beginning of the series of groups comprising only packets of the second packet type is greater than zero.

The transmitter may be arranged to transmit either the first received packet of the first packet type or the first received packet of the second packet type.

The group counter may store a value equal to the number of groups at the beginning of the series of groups comprising only packets of the second packet type.

The apparatus may further comprise: a first queue structure arranged to store received packets of the first packet type; and a second queue structure arranged to store received packets of the second packet type; wherein the transmitter is arranged to transmit a packet from either the first queue structure or the second queue structure.

A packet of the first packet type or a packet of the second packet type may only be available for transmission if there is sufficient transmit credit for that packet type.

The grouping mechanism may be arranged to group packets into groups containing packets of the first packet type and packets of the second packet type.

The grouping mechanism may be arranged to assign a group tag to each received packet, each packet within a single group being assigned the same group tag.

The grouping mechanism may be arranged to assign different group tags to packets within adjacent groups in the ordered series of groups.

The apparatus may further comprise a cyclic counter, the grouping mechanism being arranged such that the group tag assigned to a received packet is generated from the current state of the cyclic counter.

The cyclic counter may be arranged to change its value at the start of each new group.

The cyclic counter may be arranged to change its value when a packet of the first packet type is received if the previous received packet was a packet of the second packet type, such that the received packet is assigned a different group tag to the group tag assigned to the previous received packet.

The cyclic counter may be arranged to increment its value for each new group.

The group counter may be arranged to change its value if a transmitted packet is of the first packet type and has a different group tag to the next packet of the first packet type.

The group counter may be arranged to change its value by the modulus of the difference between the group tag of the transmitted packet and the group tag of the next packet of the first packet type.

The group counter may be arranged to increment its value if a transmitted packet is of the first packet type and has a different group tag to the next packet of the first packet type.

The group counter may be arranged to change its value if a transmitted packet is of the second packet type and has a different group tag to the next packet of the second packet type.

The group counter may be arranged to change its value by the modulus of the difference between the group tag of the transmitted packet and the group tag of the next packet of the second packet type.

The group counter may be arranged to decrement its value if a transmitted packet is of the second packet type and has a different group tag to the next packet of the second packet type.

Said data packets may further comprise data packets of a third packet type, wherein the grouping mechanism is further arranged to group received packets into a second ordered series of groups, in which each group contains only packets of the first packet type and packets of the third packet type, the apparatus further comprising: a second group counter arranged to indicate the number of groups at the beginning of the second series of groups comprising only packets of the third packet type; wherein a packet of the third packet type is available for transmission if but only if the second group counter stores a value indicative that the number of groups at the beginning of the second series of groups comprising only packets of the third packet type is greater than zero.

The grouping mechanism may be further arranged to group received packets into a third ordered series of groups, in which each group contains packets of the second packet type and packets of the third packet type, the apparatus further comprising: a third group counter arranged to indicate the number of groups at the beginning of the third series of groups comprising only packets of the third packet type; wherein a packet of the third packet type is available for transmission if but only if the third group counter stores a value indicative that the number of groups at the beginning of the third series of groups comprising only packets of the third packet type is greater than zero.

The apparatus may comprise a network element arranged to receive packets from a source and forward packets to a destination within a computer network.

The apparatus may comprise a network router.

BRIEF DESCRIPTION OF THE DRAWINGS

Embodiments of the present invention will now be described, by way of example only, with reference to the accompanying drawings, in which:

FIGS. 2 to 7 schematically illustrate changes in queue state as packets are transmitted from a bypass capable queue in accordance with an embodiment of the present invention;

FIGS. 8 to 10 schematically illustrate changes in queue state as packets are transmitted from a bypass capable queue in accordance with a further embodiment of the present invention;

FIG. 11 schematically illustrates an implementation of a bypass capable queue in accordance with embodiments of the present invention;

FIGS. 14 to 17 schematically illustrate changes in queue state as packets are transmitted from a bypass capable queue of FIGS. 2 to 7 under a fault condition;

FIGS. 18 and 19 schematically illustrate changes in queue state as packets are transmitted from a bypass capable queue in accordance with a further embodiment of the present invention under a similar fault condition to that illustrated by FIGS. 14 to 17;

FIGS. 20 to 23 schematically illustrate changes in queue state as packets are transmitted from a bypass capable queue in accordance with a further embodiment of the present invention; and FIGS. 24 to 28 schematically illustrate changes in queue state as packets are added to a bypass capable queue of FIGS. 20 to 23.

DETAILED DESCRIPTION OF THE INVENTION

Figure 1:
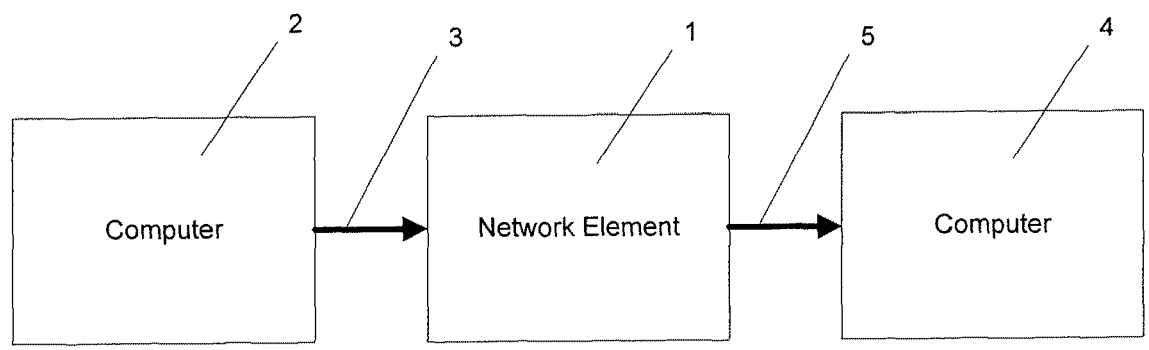
FIG. 1 schematically illustrates a network element arranged to queue packets in accordance with embodiments of the present invention.

Referring first to FIG. 1, this schematically illustrates a network element 1 implementing a method of queuing data packets in accordance with embodiments of the present invention. Network element 1 is arranged to receive data packets from a computer 2 (or other network element) along network link 3, and transmit data packets to computer 4 (or other network element) along network link 5. Network element 1 may, in certain embodiments of the present invention, comprise a router arranged to queue packets received from computer 2 and transmit packets to computer 4 as sufficient credit becomes available on network link 5, in order to prevent network link 5 from becoming overloaded.

FIG. 2 depicts all packets received at network element 1 arriving from a single source (computer 2) and being transmitted to a single destination (computer 4). However, in certain embodiments of the present invention network element 1 may for instance comprise a switch arranged to receive packets from a plurality of sources, queue the received packets, and then transmit the packets to a plurality of destinations. That is, the network element may receive packets at a plurality of inputs, each input being connected to a separate source, or the network element may be connected to a single input, which is ultimately connected to a plurality of sources. In both cases, received packets of either type are usually queued in the same queue at each input, although packets from multiple or all inputs of the network element 1 are not precluded from using a common input queue for multiple or all inputs. Similarly, the network element may transmit packets from the queue on a plurality of outputs connected to separate destinations. Alternatively, the network element may transmit packets from the queue on a single output, which is ultimately connected to a plurality of separate destinations.

Embodiments of the present invention relate to a simplified method of implementing a bypass capable queue at a network element. An example of a bypass capable queue requirement is defined in the PCI Express (PCIe) standard. Such a bypass capable queuing requirement may generate an unpredictable sequence of two distinct packet types, which may be categorized as ordered packets and bypassable packets.

Before a packet of a given packet type can be transmitted, there must be sufficient credit available on the onward network link to accommodate the transmission of that particular packet type. The term transmit credit is used within the present description of a bypass capable queue to signify whether or not there is permission to transmit a packet. In particular, while there may be sufficient transmit credit to transmit an ordered packet, there may be insufficient transmit credit to transmit a bypassable packet, or vice versa. As is known in the art, each network link has a respective buffer for each packet type, and credit for a particular packet type will exist if but only if there is sufficient space in the respective buffer The relative ordering of packets within each traffic type must be preserved. If sufficient transmit credit is not available to transmit a bypassable packet then an ordered packet may overtake one or more bypassable packets (assuming sufficient transmit credit for ordered packets is available). Bypassable packets must be prevented from overtaking any ordered packets. This can alternatively be viewed as the ordered packets having a higher priority than the bypassable packets, such that if there is insufficient transmit credit to transmit a bypassable packet then the ordered packets may be considered for transmission ahead of bypassable packets in the bypass capable queue. These ordering principles can be summarized in the following four rules:

1. Bypassable packets must not pass previously queued ordered packets;
 2. Bypassable packets must not pass previously queued bypassable packets;

3. Ordered packets must not pass previously queued ordered packets; and
4. Ordered packets must pass previously queued bypassable packets that due to a lack of transmit credit are blocked from forward progress (if there is sufficient transmit credit to transmit an ordered packet).

Conformance to rules 1 to 3 preserves packet ordering for each type of packet. Conformance to rule 4 prevents a situation in which lack of transmit credit for bypassable packets prevents the transmission of ordered packets if there is sufficient transmit credit to transmit one or more ordered packets.

In embodiments of the present invention a bypass capable queue is implemented using two separate queue structures, one queue being for queuing ordered packets and one queue being for queuing bypassable packets. That is the separate ordered packet queue and bypassable packet queue collectively form a single bypass capable queue. Packets are queued in the respective ordered packet or bypassable packet queue in the order in which they are received. The packets in each of the two queues are advanced so as to be available for transmission from the network element strictly in the order in which they are queued, thus ensuring conformance to rules 2 and 3 listed above. Conformance to rules 1 and 4 is ensured by grouping received packets, as will now be described.

As a contiguous group of ordered packets arrive at a network element (such as network element 1 shown in FIG. 1) they are assigned a common group tag. The same group tag is also assigned to a contiguous group of bypassable packets, which arrive following the contiguous group of ordered packets. The ordered packets and bypassable packets are separately stored in the ordered packet queue or bypassable packet queue respectively. The group tag assigned to each packet is also stored with the packet in the ordered packet queue or the bypassable packet queue. All the packets within a group are assigned the same group tag, with adjacent groups being assigned different group tags.

When a new ordered packet or group of ordered packets is received following the bypassable packets, the group tag changes. That is, the group tag is updated when the received packet type changes from a bypassable packet to an ordered packet, but not when the received packet type changes from an ordered packet to a bypassable packet. If the first packet to arrive at a network element is a bypassable packet then the first group will contain only bypassable packets and the group tag will change when the first ordered packet arrives.

For all groups except the first group, as the packets are received and queued a group is defined by a set of contiguous ordered packets (stored in the ordered packet queue) followed by a set of contiguous bypassable packets (stored in the bypassable packet queue). However, if an ordered packet is transmitted ahead of an earlier bypassable packet in accordance with rule 4 above (and hence the ordered packet is removed from its group) then that group may be reduced to only containing bypassable packets.

The group tag may be a small cyclically repeating number, for instance the group tag may be 0 or 1 (that is a 1 bit group tag) for alternate groups or the group tag may, for instance, be a cyclic 2-bit tag.

A group counter associated with the pair of queues keeps track of the number of groups at the beginning of the ordered series of groups containing only bypassable packets. In order to ensure conformance to rule 1, the packet at the head of the bypassable queue is only available for onwards transmission when the group counter is greater than zero. If the group counter is greater than zero then at least the first group comprises only bypassable packets, and thus no ordered packets are queued ahead of the first bypassable packet. Under fault conditions it is possible for the group counter to become a negative value, as will be explained below. Therefore the group counter is stored as a signed integer.

In an embodiment of the present invention the group counter is implemented as a 9-bit variable. It is thus possible for up to 512 separate groups containing only bypassable packets at the head of the bypass queue to be tracked, at which point further packets cannot be received as the provided credit limit will have been reached. Typically, the number of packets within the bypass capable queue. is small, unless internal switch congestion exists. The maximum number of packets which can be queued will depend upon a buffer size, it being possible to queue packets having an aggregate size not greater than the size of the buffer.

Referring now to FIG. 2, this schematically illustrates a queue state for packets within a bypass capable queue in accordance with an embodiment of the present invention. The queue state is illustrated in the form of a table, with queued packets shown in separate columns, and in either a row for ordered packets or in a row for bypassable packets depending on the type of that packet. The bypass capable queue includes both ordered packets O and bypassable packets B, each stored within either an ordered packet queue 6 or a bypassable packet queue 7 respectively. The subscripts indicate the order in which the packets are received at either queue (in ascending order). It will be appreciated that the packet numbering is purely for the purpose of clarifying the Figures, and that in reality the packets are not assigned a sequential packet number. Hence the front of the queue (that is the first received and queued packet) is to the right, and packets are added to the left of the queue as they arrive.

The current status of the group counter is shown. The ordered packets O and bypassable packets B are displayed in an offset fashion such that only one packet of either sort is located at each horizontal location across the pairs of queues (to clarify the grouping of packets, described below). The group tag 8 for each group is shown (though as noted above the assigned group tag is generally stored together with each packet in the group within the respective queues). The group tag for the bypass capable queue shown in FIG. 2 comprises a 1 bit cyclic number (that is 0 or 1) with adjacent groups assigned different group tags. The first group (the group furthest to the right) is assigned a group tag of 0, although alternatively the first group could be assigned a group tag of 1.

For the bypass capable queue shown in FIG. 2 a group counter 9 is shown. Group counter 9 has a value of 1 because the first group (that is the group of earliest received packets) comprises only bypassable packets $B_0$ and $B_1$. Consequently, if sufficient bypassable packet transmit credit is available at the output of the network element (such as network element 1 shown in FIG. 1) then the packet or packets at the head of the bypassable queue are transmitted.

If packets $B_0$ and $B_1$ are thus transmitted then the bypass capable queue state afterwards is as shown in FIG. 3. The group counter 9 is now set to a value of zero, as there is no longer a group at the head of the bypass capable queue consisting only of bypassable packets. The process of updating the group counter 9 will be described below in connection with FIG. 12. Bypassable packet $B_4$ is not available for transmission because the group counter is zero, in accordance with rule 1 above. The group counter 9 being zero reflects the fact that there are no groups consisting only of bypassable packets at the head of the bypass capable queue, and thus ordered packets $O_2$ and $O_3$ were received at the network element before any of the currently queued bypassable packets.

Assuming transmit credit is available for ordered packets $O_2$ and $O_3$ then these packets are transmitted and the bypass capable queue state is as shown in FIG. 4. The group shown in FIG. 3 consisting of packets $O_2$ and $O_3$ and $B_4$ now, in the queue state shown in FIG. 4, consists only of a single bypassable packet $B_4$ and therefore the group counter 9 returns to 1. Packet $B_4$ is therefore now available for transmission. However, this time there is insufficient bypassable transmit credit, and therefore, in accordance with rule 4 above, ordered packet $O_5$ must overtake bypassable packet $B_4$ (assuming there is sufficient transmit credit available to transmit ordered packets) to prevent blocking at the head of the bypass capable queue.

After ordered packet $O_5$ is transmitted, the bypass capable queue is as shown in FIG. 5. There are now four bypassable packets $B_4$, $B_6$, $B_7$ and $B_8$ in two groups prior to the first ordered packet $O_9$, and as such the group counter 9 has increased to 2. Assuming that sufficient bypassable transmit credit is now available, the first bypassable packet $B_4$ is transmitted, such that the queue state is as shown in FIG. 6 with the group counter 9 reduced to one. Packets $B_6$, $B_7$ and $B_8$ are then transmitted such that the queue state is as show in FIG. 7 with the group counter 9 reduced to zero. Now that the group counter 9 has reduced to zero only the packet at the head of the ordered queue $O_9$ may be transmitted, in order to prevent bypassable packet $B_{10}$ from overtaking an ordered packet (thus ensuring conformance to rule 1 above).

As noted above, each time a packet is received at the network element a group tag 8 is assigned to the newly received packet and the packet is stored either in the ordered queue 6 or the bypassable queue 7 as appropriate. The group tag 8 that is assigned remains the same as that for the previous packet (that is, the previous received packet and the currently received packet are assigned to the same group) if the previous packet and the current received packet are of the same type (that is, both ordered packets or both bypassable packets). As further noted above, the group tag changes only if there is a change in packet type from the previous packet being a bypassable packet to the current packet being an ordered packet. The group tag does not change if there is a change in packet type from the previous packet being an ordered packet to the current packet being a bypassable packet.

With reference to FIG. 8, in order to facilitate the correct assignment of group tags to newly received data packets two further variables are maintained and updated each time a new packet is received. A last packet type variable 10*a* indicates whether the last received packet was an ordered packet or a bypassable packet. A last packet tag variable 10*b* indicates the group tag that was assigned to the last received packet (either a 0 or a 1).

Normally the last packet type 10*a* and last packet tag 10*b* variables are only updated when a packet is added to one of the queues 6, 7. However, if the last packet received was an ordered packet and that packet is removed from the bypass capable queue before one or more previously queued bypassable packets, then the last packet type variable 10*a* must be changed to bypassable and the last packet tag variable 10*b* must be changed to match the group tag 8 of the final bypassable packet. If the last packet received was a bypassable packet then it is only possible for that packet to be removed next if it is the last packet in the bypass capable queue (that is, there are no other ordered packets or bypassable packets). Therefore, as the last packet is removed the bypass capable queue is emptied and the variables must be reinitialized when a new packet is received, as will be described below.

Referring to FIG. 8 this illustrates the queue state shown in FIG. 7, but also shows the status of last packet type and last packet tag variables 10*a* and 10*b* respectively. The last packet received, $O_{12}$, is an ordered packet and has the group tag 0. After packet $O_9$ is transmitted the queue state is as shown in FIG. 9.

For the queue state of FIG. 9, if transmit credit is unavailable for bypassable packet $B_{10}$ then if transmit credit is available for the ordered packets $O_{11}$ and $O_{12}$ they are transmitted such that the queue state is as shown in FIG. 10. Alternatively, if there is insufficient ordered packet transmit credit to transmit both packets $O_{11}$ and $O_{12}$ then only packet $O_{11}$ will be transmitted initially, and $O_{12}$ may later be transmitted when there is once again sufficient ordered packet transmit credit to transmit a further ordered packet. If both packets $O_{11}$ and $O_{12}$ are transmitted then the last packet type variable 10*a* changes to bypassable and the last packet tag variable 10*b* changes to 1 as shown in FIG. 10 to reflect the change in the last packet status.

Referring now to FIG. 11, an implementation of a bypass capable queue in accordance with an embodiment of the present invention will now be described. Two random access memory (RAM) structures are defined: a data RAM 11, which stores the contents of each ordered or bypassable packet, and a control RAM 12, which stores packet descriptors 13 containing pointers to the packet contents within the data RAM 11. The control RAM 12 also implements the ordered and bypassable data queue structures. Each packet descriptor 13 in addition to storing a pointer to the packet contents within the data RAM 11 stores other information relating to each packet, such as the assigned group tag 14. That is, the packet descriptor 13 includes the group tag 14.

In order to implement the bypass capable queue it is not necessary to provide pointers or other links between the ordered packet queue and the bypassable packet queue, nor is a time stamp for each packet required. The variables required to implement the bypass capable queue are stored in a series of registers. It will be appreciated that in alternative embodiments of the present invention the manner in which the variables and the packet data are stored may vary, for instance the variables may also be stored in RAM instead of registers.

Two head of queue pointers Queue 1 and Queue 2 are stored in registers 15 and 16 respectively. The head of queue pointers Queue 1 and Queue 2 point to the packet descriptor 13 at the head of the ordered and the bypassable queues respectively. Each packet descriptor 13 stores a pointer to a cell 17 within the data RAM 11 containing a first portion of the packet data for a particular packet.

The cell 17 pointed to in the data RAM 11 may also contain a pointer to a second cell 17, in the event that the packet is larger than the storage capacity of a single cell. Indeed, a single packet may be stored across any number of cells 17, with links between each cell and its following cell, dependent upon the size of the packet and the size of each cell. The last cell 17 storing part of a single packet is denoted by an "END" tag, in place of a pointer to a further cell 17. It will be appreciated that cells forming a single packet need not form a contiguous block of RAM. Furthermore, cells need not be arranged in the data RAM 11 in any order.

The packet descriptor 13, in addition to storing a pointer to a first cell 17 storing a portion of the packet data and the group tag 14, may also store other information such as routing information. As noted above, the packet descriptor 13 for the first packet in each queue is pointed to by a head of queue pointer Queue 1 or Queue 2. Each packet descriptor 13 additionally stores a pointer to the packet descriptor 13 for the following packet in that queue. Packet descriptors 13 for each queue in the control RAM 12 need not be stored in contiguous blocks of RAM, nor in any particular order within the control RAM.

The last packet type and last packet tag variables are stored in registers 18 and 19 respectively. The last packet type and last packet tag variables are used in determining which packet to transmit next and which group tag to assign when a new packet is received, as will be described below in connection with the flow charts of FIGS. 12 and 13 respectively. The group counter is stored in a register 20.

Figure 12:
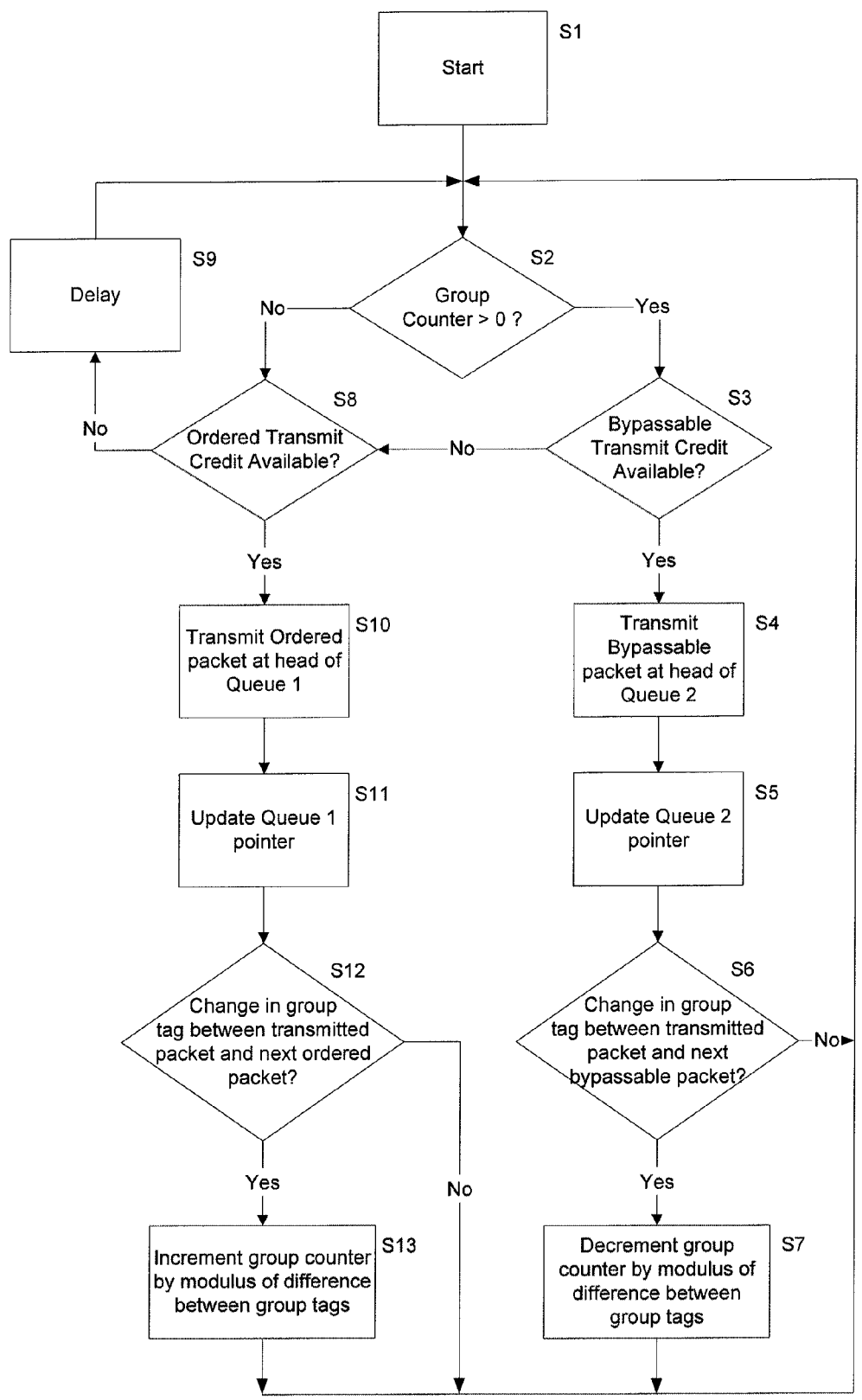
FIG. 12 schematically illustrates in the form of a flow chart the process of transmitting a packet from a bypass capable queue in accordance with embodiments of the present invention.

Referring now to FIG. 12, this schematically illustrates in the form of a flow chart the process of determining which packet to transmit next from the bypass capable queue. The process starts at step S1 and passes to decision step S2 at which point the current value of the group counter is checked.

If the group counter is greater than zero then at least one bypassable packet is available for transmission (because there is no earlier queue ordered packet). If so, the process passes to decision step S3, where the available bypassable transmit credit is checked to see if there is sufficient transmit credit to transmit a bypassable packet. If sufficient transmit credit is available then the process continues at step S4 by transmitting the bypassable packet at the head of the bypassable queue pointed to by pointer Queue 2. Pointer Queue 2 is updated at step S5 to the next packet in the bypassable queue. If the transmitted packet was the last bypassable packet, then the pointer Queue 2 is set to a null or default value.

At decision step S6 it is determined whether after the bypassable packet has been transmitted it is necessary to update the group counter. When a bypassable packet has been transmitted the group tag of the transmitted packet and the next bypassable packet in the bypassable queue are compared. If the group tags differ then it can be inferred that the transmitted packet was the last packet in the group at the head of the bypass capable queue. Consequently, the group counter is decremented at step S7 by the modulus (that is the absolute value) of the difference between the group tags as there is one less group at the head of the bypass capable queue comprising only bypassable packets. The process then passes back to step S2 to determine the next packet to be transmitted.

If no change in group tag is detected at step S6 then it can be inferred that other bypassable packets remain in the same group at the head of the bypass capable queue, and thus the group counter is not decremented. The process passes back to step S2 to determine the next packet to be transmitted.

If, at step S3, it is determined that there is insufficient bypassable transmit credit to transmit a bypassable packet then the process passes to decision step S8 where a check is made whether there is sufficient ordered transmit credit available to transmit an ordered packet. Alternatively, if at step S2 the group counter is zero (or negative in the fault condition) then the process passes directly to step S8. If at step S8 it is determined that there is insufficient transmit credit to transmit an ordered packet then no packet may be transmitted during the current pass through the flow chart and the process returns to step S2, via in some embodiments a short time delay S9 to prevent repeated checking of the group counter while insufficient transmit credit is available.

If at step S8 it is determined that an ordered packet can be transmitted (and if there is at least one ordered packet to transmit) then the ordered packet at the head of the ordered packet queue is transmitted at step S10. Pointer Queue 1 is updated at step S11 to the next packet in the ordered queue. If the transmitted packet was the last ordered packet, then the pointer Queue 1 is set to a null or default value.

At decision step S12 it is determined whether after the ordered packet has been transmitted it is necessary to update the group counter. When an ordered packet has been transmitted the group tag of the transmitted packet and the next ordered packet in the ordered queue are compared. If the group tags differ then it can be inferred that the transmitted packet was the last ordered packet in the group at the head of the bypass capable queue. Consequently, the group counter is incremented at step S13 by the modulus of the difference between the group tags. This is done because if there are no more ordered packets in the group at the head of the bypass capable queue then there will be at least one more group at the front of the bypass capable queue comprising only bypassable packets. If there is no change in group tag, then it can be inferred that other ordered packets remain in the same group at the head of the bypass capable queue, and thus the group counter is not incremented. Either way, the process passes back to step S2 to determine the next packet to be transmitted.

Figure 13:
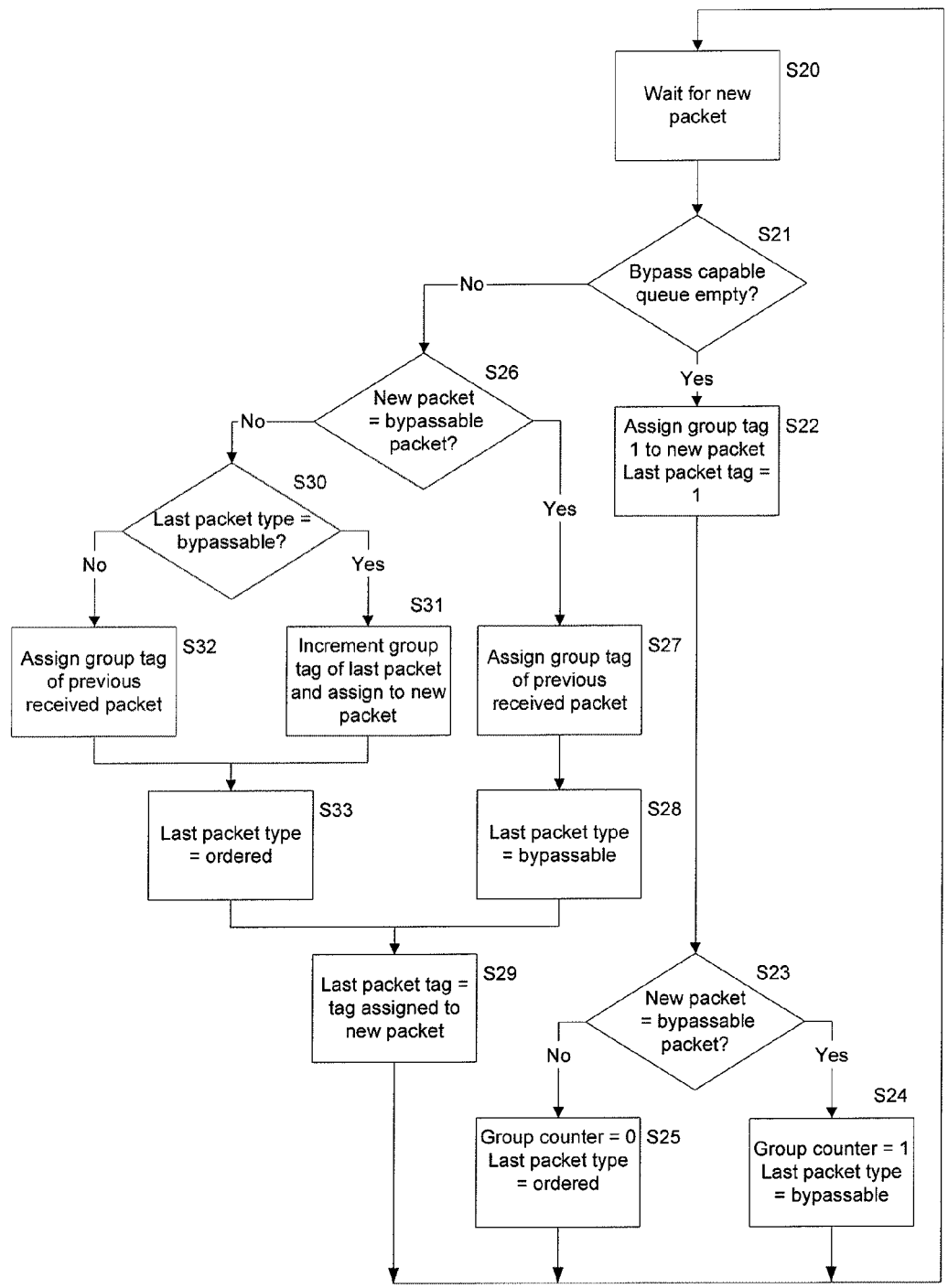
FIG. 13 schematically illustrates in the form of a flow chart the process of adding a packet to a bypass capable queue in accordance with embodiments of the present invention.

Referring to FIG. 13, this schematically illustrates in the form of a flow chart the process of assigning a group tag to a newly received packet and updating the last packet type and the last packet tag variables. The process begins at step S20 when a new packet is received. At decision step S21 it is determined from the head of queue pointers Queue 1 and Queue 2 whether the bypass capable queue is currently empty (that is, whether the newly received packet is the first received packet or whether either the ordered packet queue or the bypassable packet queue already contain at least one packet). If the bypass capable queue is currently empty then at step S22 the newly received packet is assigned an arbitrary group tag (shown as a 1 in FIG. 13, but it could be any value). The last packet tag variable is set to the assigned group tag.

At step S23 it is determined whether the new packet is a bypassable packet. If the new packet is a bypassable packet then at step S24 the group counter is set to 1 as the new packet forms a group of a single packet containing only bypassable packets. Also at step S24 the last packet type variable is set to bypassable. If however at step S23 it is determined that the new packet is an ordered packet then at step S25 the group counter is set to 0. Also at step S25 the last packet type variable is set to ordered. The process then passes back to step S20 to wait for the next received packet.

If at step S21 it is determined that the bypass capable queue is not empty (that is there are already at least one packet in either the ordered queue or the bypassable queue) then at step S26 it is determined whether the new packet is a bypassable packet. If the new packet is a bypassable packet then at step S27 the group tag of the previous packet (determined from the last packet tag variable) is assigned to the newly received packet. At step S28 the last packet type variable is set to bypassable. At step S29 the last packet tag variable is set to the group tag that was assigned to the new packet at step S27.

If at step S26 it is determined that the new packet is an ordered packet then at step S30 the last packet type variable is checked. If the last packet type variable is set to bypassable then at step S31 the previous group tag (determined from the last packet tag variable) is incremented and that new value is assigned to the new packet. Alternatively if the last packet type variable is set to ordered then at step S32 the group tag of the previous packet (determined from the last packet tag variable) is assigned to the new packet. At step S33 the last packet type variable is set to ordered and the process passes to step S29. After the last packet tag variable has been set, the process returns to step S20 to wait for the next received packet.

A bypass capable queue as described above in connection FIGS. 2 to 10 implements the group tag as a 1-bit number (that is, either 0 or 1). However, using a 1-bit group tag the ordering integrity of the bypass capable queue is susceptible to errors within the control RAM 2. In a simple embodiment, if an error is detected in the packet descriptor of a packet then the packet is discarded. However, for a 1-bit group tag this can have serious implications for the packet ordering, and could result in a packet being scheduled for transmission at the wrong time thereby contravening one of rules 1 to 4 above.

Referring to FIG. 14, this illustrates a bypass capable queue similar to the queues shown in FIGS. 2 to 10 implemented with a 1-bit group number. The group counter 9 is zero as there are no groups at the head of the bypass capable group containing only bypassable packets.

If ordered packet $O_0$ is transmitted (step S10 of FIG. 12), the packet descriptor for ordered packet $O_2$ is read within the control RAM and the head of queue pointer Queue 1 for the ordered queue is changed to point to the descriptor for packet $O_2$ (step S11). If the control RAM is error free then the group tag 8 of packet $O_2$ read from the control RAM and the group tag 8 of transmitted packet $O_0$ are compared (step S12). The change in the group tag 8 from packet $O_0$ to packet $O_2$ is detected and the group counter 9 is incremented by one (step S13) in order to reflect the fact that there is now a new group at the head of the bypass capable queue containing only a bypassable packet ($B_1$).

If, however, when attempting to read the packet descriptor for packet $O_2$ the control RAM read operation fails then packet $O_2$ is discarded and the details of the next ordered packet ($O_6$) are read instead. Packet $O_6$ is in a different group to packet $O_2$ and so has a different group tag 8. For a 1-bit group tag, the group tag 8 for packet $O_6$ is the same as the group tag 8 for transmitted packet $O_0$. Consequently, at step S12 no change in group tag 8 is detected. As a consequence, the group counter 9 is not updated and thus the queue order is effectively changed. The resulting queue state is as shown in FIG. 15. Packet $O_2$ has been discarded. Packet $O_6$ at the head of the ordered packet queue 6 effectively appears to have moved groups, such that it is now in the same group as packet $B_1$ having overtaken four bypassable packets, as it has the same group tag as packet $B_1$. The group counter 9 remains at zero as it was mistakenly not incremented when packet $O_0$ was transmitted, with the result that packet $B_1$ may not under any circumstances be transmitted until packet $O_6$ has been transmitted. It is clear that the ordering of the bypass capable queue has been altered in an undesirable manner.

If, following on from the position in FIG. 15, ordered packet $O_6$ is transmitted, the queue state becomes that shown in FIG. 16. When packet $O_6$ is transmitted, at step S12 a check is made to see if there is a change in group tag 8 from the transmitted ordered packet to the next ordered packet $O_8$. Packet $O_6$ has a group tag of 1. Packet $O_8$ has a group tag of 0. Consequently, at step S13 the group counter 9 is updated by the difference between the two group tags 8, such that as shown in FIG. 16 the group counter is now 1. This is clearly wrong, as FIG. 16 shows that there are three groups at the head of the bypass capable queue containing only bypassable packets, and thus the group counter should be 3.

If now bypassable packet $B_1$ is transmitted (assuming sufficient bypassable transmit credit is available) then the ordering becomes even more corrupted as shown in FIG. 17. As there is a change in group tag from packet $B_1$ to the next bypassable packet $B_3$, this is detected at step S6 and the group counter 9 is decremented back to zero at step S7. Therefore no more bypassable packets can be transmitted, and ordered packets $O_8$ and $O_9$ are effectively promoted to the head of the bypass capable queue.

One option for preventing this corruption is to implement the control RAM 12 storage in such a way that it could be guaranteed that the group tag 14 within a packet descriptor 13 can be read correctly even if the rest of the packet descriptor 13 is corrupt. The group tag 14 could then be tracked correctly and the original ordering maintained. Virtually all faults could be corrected with tag replication (that is storing each group tag multiple times within the control RAM 12). All instances of a particular group tag could then be read and a majority-voting scheme implemented within which if some instances of a group tag are corrupted then as long as most instances of the group tag are read correctly then the correct group tag can be determined. However, as in practice this possible approach cannot be relied upon to be 100% reliable, an alternative option for preventing corruption is to extend the group tag to an n bit counter, where n is greater than 1.

Using an n bit counter to generate group tags, a change in group tag from one packet to the next will always be detected as long as no more than $2^n-1$ packets are ever discarded due to control RAM errors. For a 2-bit group tag up to three packets could be safely discarded before the ordering could become corrupted. For a 3-bit tag up to seven packets could be discarded without corruption. If discarded packets share the same group tag then even more packets could be discarded, without corruption. A value of n=2 is an acceptable compromise between complexity and error detection capability.

FIG. 18 illustrates the queue state of a bypass capable queue having a 2-bit group tag. If packet $O_0$ is transmitted then a change in the group tag would be detected (step S12) for the next read ordered packet descriptor advanced into the head of queue register Queue 1 unless all of packets $O_3$, $O_4$, $O_6$, and $O_{10}$, are lost due to control RAM errors, as only then would no change of group tag between packet $O_0$ and packet $O_{12}$ be detected (they both have a group tag 0). It is relatively unlikely that this many packets would be lost without catastrophic failure of the control RAM, which would be likely to prevent recovery in any event.

If, however, only packets $O_3$ and $O_4$ have to be discarded due to control RAM errors then ordered packet $O_6$ would be advanced to the head of the ordered queue and pointed to by head of queue pointer Queue 1. At step S12 the change between the group tag of $O_0$ (0) and the group tag of $O_6$ (2) would be detected and at step S13 the modulus of the difference in group tags (2) would be added to the group counter resulting in the correct queue state as shown in FIG. 19. FIG. 19 shows the group counter now being 2 (even though only one packet was transmitted), correctly indicating that there are two groups of packets only containing bypassable packets prior to the first queued ordered packet.

In accordance with a further embodiment of the present invention a bypass capable queue is provided capable of ensuring compliance to ordering rules for more than two different packet types. The PCI-Express (Peripheral Component Interconnect Express, PCIe) standard defines three different types of packets: posted, completion and non-posted packets. The three packet types have different levels of priority. Posted packets are at a higher priority than completion packets and in turn completion packets are at a higher priority than non-posted packets. This varying priority of packets can be expressed by the following ordering rules:

1. Non-posted packets must not overtake any previously queued packet;
2. Completion packets must not overtake any previously queued completion or posted packets, but they may overtake previously queued non-posted packets; and
3. Posted packets must not overtake any previously queued posted packets, but they may overtake previously queued completion or non-posted packets.

A bypass capable queue conforming to the PCIe standard can be implemented in accordance within an embodiment of the present invention by ensuring each type of packet is stored in a separate packet queue within the control RAM (with a third head of queue pointer Queue 3 stored in a further register to accommodate the additional queue). Storing each packet type in a separate queue ensures that ordering of each packet with regard to all the other packets of the same type is maintained.

Relative ordering between the three queues in accordance with the above rules is maintained by assigning three separate group tags, each tag having an associated group counter. Each packet as it is received is assigned two group tags, which are stored within the packet descriptor in the control RAM. A first tag is used to maintain ordering between posted and completion packets. A second tag is used to maintain ordering between posted and non-posted packets. A third tag is used to maintain ordering between completion and non-posted packets. Each packet is stored with the two tags that relate to the packet type of that packet. A separate group counter for each group tag is also maintained.

Referring now to FIG. 20, this illustrates a queue state for a bypass capable queue formed from three separate queues 30-32, each holding posted, completion or non-posted packets respectively. Also shown in FIG. 20 are the three group tags 33, 35, 37 and the three group counters 34, 36, 38. As noted above, each of the group tags 33, 35, 37 and each of the group counters 34, 36, 38 are only relevant to two of the three packet queues 30-32. The prefix PC before a group tag or a group counter means that it is relevant to both the posted and the completion packet types. The prefix PN means that it is relevant to both the posted and the non-posted packet types. The prefix CN means that it is relevant to both the completion and the non-posted packet types.

As for FIGS. 2 to 10 and 14 to 19, the suffix applied to each packet defines the order in which packets are received at the network element and queued in a queue. A posted packet is denoted by a P, a completion packet by a C and a non-posted packet by an N. As for the examples of a bypass capable queue having only two packet types, a packet may only be transmitted if it is available for transmission in accordance with the above three rules and if there is sufficient transmit credit available for that type of packet. Assuming sufficient transmit credit available, a posted packet is available for transmission from the posted queue 30 at any time. Assuming sufficient transmit credit is available, packets are only available for transmission from the completion queue 31 when there are no prior posted packets, indicated by a value greater than zero for the PC group counter 34. A packet is only available for transmission from the non-posted queue 32 when there are no prior posted or completion packets, indicated by values greater than zero for the PN group counter 36 and the CN group counter 38.

In the queue state shown in FIG. 20, because the PC group counter 34 and the PN group counter 38 are both zero, only posted packet $P_0$ is available for transmission. If packet $P_0$ is transmitted then because the new packet at the head of the posted queue 30 ($P_4$) has a different PC group tag value 33, the PC group counter 34 is incremented. Additionally, as packet $P_4$ has a different PN group tag 35, the PN group counter 36 is also incremented. The CN group counter 38 is unaffected by the transmission of packet $P_0$. The queue state is now as shown in FIG. 21.

Referring to FIG. 21, as the PC group counter is greater than zero, transmission of a packet from the completion queue 31 can be considered. However, because the CN group counter 38 is still zero, nothing may be transmitted from the non-posted queue 32 ahead of completion packet $C_1$. Completion packet $C_1$ could be transmitted, as could the posted packet $P_4$ (which would overtake two completion packets and one non-posted packet).

Assuming completion packet $C_1$ is transmitted, the queue state becomes that shown in FIG. 22. The completion head packet (that is the packet at the head of the completion queue 31) $C_3$ has the same PC group tag 33, so the PC group counter 34 is unaffected. Packet $C_3$ has a different CN group tag 38, so CN group counter 38 is incremented. The PN group counter is unaffected 36.

Non-posted packet $N_2$ is now available for transmission because both the PN group counter 36 and the CN group counter 38 are greater than zero. Completion head packet $C_3$ is also available because the PC group counter 34 is non zero and it is allowed to overtake the earlier queued non-posted packets (assuming that there is insufficient non-posted transmit credit). Finally, the head posted packet $P_4$ could be transmitted, if there is insufficient transmit credit to transmit any other type of packet.

If non-posted packet $N_2$ is transmitted then the queue state becomes that shown in FIG. 23. The new non-posted head packet $N_5$ has a different PN group tag so the PN group counter 36 is decremented back to zero. Packet $N_5$ also has a different CN group tag 37, so the CN group counter 38 is decremented back to zero. The PC group counter 34 is unaffected by this transmission.

When the last completion packet is transmitted, because no further completion packets are queued the PC group counter is decremented to zero. When the last non-posted packet is transmitted, because no further non-posted packets are queued the PN group counter and the CN group counter are decremented to zero.

Referring now to FIG. 24, this illustrates a queue state after the last packet has been transmitted. All three group counters 34, 36, 38 are zero. The three group tags 33, 35, 37 are at arbitrary values dependent upon their values when the last packets were transmitted (or they could be reinitialized to a default value).

If a new non-posted packet $N_{14}$ is added to the empty bypass capable queue then the queue state is as shown in FIG. 25. Packet $N_{14}$ must be in advance of any posted or completion packets added later so both the PN group counter 36 and the CN group counter 38 are set to 1.

If a new completion packet C15 is now added the queue state is as shown in FIG. 25. As the previous packet added to either the completion queue 31 or the non-posted queue 32 was the non-posted packet $N_{14}$ then a new CN group tag 37 must be assigned to packet $C_{15}$. Packet $C_{15}$ must be in advance of any posted packet added later so the PC group counter 34 is set to 1.

If a new non-posted packet $N_{16}$ is added, then the queue state is as shown in FIG. 27. A posted packet $P_{17}$ is then received and the queue state is as shown in FIG. 28. As the previous packet added to either the posted or the completion queues 30, 31 was a completion packet $C_{15}$ then a new PC group tag 33 must be assigned. Also, as the previous packet added to either the posted or non-posted queues 30, 32 was a non-posted packet $N_{16}$ then a new PN group tag 33 must be assigned.

It will be readily apparent to the appropriately skilled person that the number of packet types within a bypass capable queue in accordance with the present invention may be increased beyond three packet types (albeit at the cost of an increased number of group tags and group counters). Further modifications and applications of the present invention will be readily apparent to the appropriately skilled person from the teaching herein, without departing from the scope of the appended claims.

The invention claimed is:

1. A method of queuing data packets, said data packets comprising data packets of a first packet type and data packets of a second packet type, the method comprising:
grouping received packets of said first and second packet types into an ordered series of groups, at least some of said groups comprising both packets of said first type and packets of said second type, and each group comprising at least one packet;
maintaining a group counter having a value indicating the number of groups at the beginning of the series of groups comprising only packets of the second packet type;
transmitting a packet; and
changing the value of the group counter to indicate that there are no groups at the beginning of the series of groups comprising data packets only of the second packet type if a group at the beginning of the series of groups comprises a data packet of the first type;
wherein a packet of the second packet type is available for transmission if but only if the group counter is indicative that the number of groups at the beginning of the series of groups comprising only packets of the second packet type is greater than zero.

2. A method according to claim 1, wherein transmitting a packet comprises transmitting either the first received packet of the first packet type or the first received packet of the second packet type.

3. A method according to claim 1, wherein maintaining a group counter comprises maintaining a group counter equal to the number of groups at the beginning of the series of groups comprising only packets of the second packet type.

4. A method according to claim 1, further comprising:
maintaining a first queue of received packets of the first packet type; and
maintaining a second queue of received packets of the second packet type;
wherein transmitting a packet comprises transmitting a packet from either the first or the second queue.

5. A method according claim 1, wherein a packet of the first packet type or a packet of the second packet type is only available for transmission if there is sufficient transmit credit for that packet type.

6. A method according to claim 1, wherein each group contains packets of the first packet type and packets of the second packet type.

7. A method according to claim 1, wherein grouping received packets into an ordered series of groups comprises assigning a group tag to each received packet, each packet within a single group being assigned the same group tag.

8. A method according to claim 7, wherein packets within adjacent groups in the ordered series of groups are assigned different group tags.

9. A method according to claim 7, wherein the group tag assigned to a received packet is generated from the current state of a cyclic counter.

10. A method according to claim 9, further comprising changing the value of the cyclic counter for each new group.

11. A method according to claim 10, wherein changing the value of the cyclic counter for each new group comprises changing the value of the cyclic counter when a packet of the first packet type is received if the previous received packet was a packet of the second packet type, such that the received packet is assigned a different group tag to the group tag assigned to the previous received packet.

12. A method according to claim 10, wherein said changing comprises incrementing the value of the cyclic counter.

13. A method of queuing data packets, said data packets comprising data packets of a first packet type and data packets of a second packet type, the method comprising:
grouping received packets of said first and second packet types into an ordered series of groups, at least some of said groups storing both packets of said first type and packets of said second type, and each group comprising at least one packet, wherein grouping received packets into an ordered series of groups comprises assigning a group tag to each received packet, each packet within a single group being assigned the same group tag;
maintaining a group counter indicating the number of groups at the beginning of the series of groups comprising only packets of the second packet type;
transmitting a packet;
wherein a packet of the second packet type is available for transmission if but only if the group counter is indicative that the number of groups at the beginning of the series of groups comprising only packets of the second packet type is greater than zero;
wherein grouping received packets into an ordered series of groups comprises assigning a group tag to each received packet, each packet within a single group being assigned the same group tag; and
changing the value of the group counter if a transmitted packet is of the first packet type and has a different group tag to the next packet of the first packet type.

14. A method according to claim 13, wherein said changing comprises changing the value of the group counter by the modulus of the difference between the group tag of the transmitted packet and the group tag of the next packet of the first packet type.

15. A method according to claim 13, wherein said changing comprises incrementing the value of the group counter.

16. A method of queuing data packets, said data packets comprising data packets of a first packet type and data packets of a second packet type, the method comprising:
grouping received packets of said first and second packet types into an ordered series of groups, at least some of said groups storing both packets of said first type and packets of said second type, and each group comprising at least one packet, wherein grouping received packets into an ordered series of groups comprises assigning a group tag to each received packet, each packet within a single group being assigned the same group tag;
maintaining a group counter indicating the number of groups at the beginning of the series of groups comprising only packets of the second packet type;
transmitting a packet;
wherein a packet of the second packet type is available for transmission if but only if the group counter is indicative that the number of groups at the beginning of the series of groups comprising only packets of the second packet type is greater than zero;
wherein grouping received packets into an ordered series of groups comprises assigning a group tag to each received packet, each packet within a single group being assigned the same group tag; and
changing the value of the group counter if a transmitted packet is of the second packet type and has a different group tag to the next packet of the second packet type.

17. A method according to claim 16, wherein said changing the value of the group counter comprises changing the value of the group counter by the modulus of the difference between the group tag of the transmitted packet and the group tag of the next packet of the second packet type.

18. A method according to claim 16, wherein said changing comprises decrementing the value of the group counter.

19. A method of queuing data packets, said data packets comprising data packets of a first packet type and data packets of a second packet type, the method comprising:
grouping received packets of said first and second packet types into an ordered series of groups, each group comprising at least one packet;
maintaining a group counter indicating the number of groups at the beginning of the series of groups comprising only packets of the second packet type; and
transmitting a packet;
wherein a packet of the second packet type is available for transmission if but only if the group counter is indicative that the number of groups at the beginning of the series of groups comprising only packets of the second packet type is greater than zero;
wherein said data packets further comprise data packets of a third packet type, the method further comprising:
grouping received packets into a second ordered series of groups, in which each group contains only packets of the first packet type and packets of the third packet type; and
maintaining a second group counter indicating the number of groups at the beginning of the second series of groups comprising only packets of the third packet type;
wherein a packet of the third packet type is available for transmission if but only if the second group counter is indicative that the number of groups at the beginning of the second series of groups comprising only packets of the third packet type is greater than zero.

20. A method according to claim 19, further comprising:
grouping received packets into a third ordered series of groups, in which each group contains packets of the second packet type and packets of the third packet type; and
maintaining a third group counter indicating the number of groups at the beginning of the third series of groups comprising only packets of the third packet type;
wherein a packet of the third packet type is available for transmission if but only if the third group counter is indicative that the number of groups at the beginning of the third series of groups comprising only packets of the third packet type is greater than zero.

21. A non-transitory carrier medium carrying computer readable code for controlling a computer to carry out the method of claim 1.

22. A computer apparatus for queuing data packets, the apparatus comprising:
a program memory storing processor readable instructions; and
a processor configured to read and execute instructions stored in said program memory;
wherein the processor readable instructions comprise instructions controlling the processor to carry out the method of claim 1.

23. An apparatus for queuing data packets, said data packets comprising data packets of a first packet type and data packets of a second packet type, the apparatus comprising:
a grouping mechanism arranged to group received packets of said first and second packets into an ordered series of groups, at least some of said groups comprising both packets of said first type and packets of said second type, and each group containing at least one packet of any packet type;
a group counter having a value indicating the number of groups at the beginning of the series of groups comprising only packets of the second packet type; and
a transmitter arranged to transmit a packet;
wherein the group counter is arranged to change the value to indicate that there are no groups at the beginning of the series of groups comprising data packets only of the second packet type if a group at the beginning of the series of groups comprises a data packet of the first type; and
wherein a packet of the second packet type is available for transmission if but only if the group counter stores a value indicative that the number of groups at the beginning of the series of groups comprising only packets of the second packet type is greater than zero.

24. An apparatus according to claim 23, wherein the transmitter is arranged to transmit either the first received packet of the first packet type or the first received packet of the second packet type.

25. An apparatus according to claim 23, wherein the group counter stores a value equal to the number of groups at the beginning of the series of groups comprising only packets of the second packet type.

26. An apparatus according to claim 23, further comprising:
a first queue structure arranged to store received packets of the first packet type; and
a second queue structure arranged to store received packets of the second packet type;
wherein the transmitter is arranged to transmit a packet from either the first queue structure or the second queue structure.

27. An apparatus according to claim 23, wherein a packet of the first packet type or a packet of the second packet type is only available for transmission if there is sufficient transmit credit for that packet type.

28. An apparatus according to claim 23, wherein the grouping mechanism is arranged to group packets into groups containing packets of the first packet type and packets of the second packet type.

29. An apparatus according to claim 23, wherein the grouping mechanism is arranged to assign a group tag to each received packet, each packet within a single group being assigned the same group tag.

30. An apparatus according to claim 29, wherein the grouping mechanism is arranged to assign different group tags to packets within adjacent groups in the ordered series of groups.

31. An apparatus according to claim 29, further comprising a cyclic counter, the grouping mechanism being arranged such that the group tag assigned to a received packet is generated from the current state of the cyclic counter.

32. An apparatus according to claim 31, wherein the cyclic counter is arranged to change its value at the start of each new group.

33. An apparatus according to claim 32, wherein the cyclic counter is arranged to change its value when a packet of the first packet type is received if the previous received packet was a packet of the second packet type, such that the received packet is assigned a different group tag to the group tag assigned to the previous received packet.

34. An apparatus according to claim 32, wherein the cyclic counter is arranged to increment its value for each new group.

35. An apparatus according to claim 23, wherein the apparatus comprises a network element arranged to receive packets from a source and forward packets to a destination within a computer network.

36. An apparatus according to claim 35, wherein the apparatus comprises a network router.

37. An apparatus for queuing data packets, said data packets comprising data packets of a first packet type and data packets of a second packet type, the apparatus comprising:
  a grouping mechanism arranged to group received packets of said first and second packets into an ordered series of groups, and each group containing at least one packet of any packet type, wherein the grouping mechanism is arranged to assign a group tag to each received packet, each packet within a single group being assigned the same group tag;
  a group counter indicating the number of groups at the beginning of the series of groups comprising only packets of the second packet type; and
  a transmitter arranged to transmit a packet;
  wherein a packet of the second packet type is available for transmission if but only if the group counter stores a value indicative that the number of groups at the beginning of the series of groups comprising only packets of the second packet type is greater than zero;
  wherein the grouping mechanism is arranged to assign a group tag to each received packet, each packet within a single group being assigned the same group tag; and
  wherein the group counter is arranged to change its value if a transmitted packet is of the first packet type and has a different group tag to the next packet of the first packet type.

38. An apparatus according to claim 37, wherein the group counter is arranged to change its value by the modulus of the difference between the group tag of the transmitted packet and the group tag of the next packet of the first packet type.

39. An apparatus according to claim 37, wherein the group counter is arranged to decrement its value if a transmitted packet is of the first packet type and has a different group tag to the next packet of the first packet type.

40. An apparatus for queuing data packets, said data packets comprising data packets of a first packet type and data packets of a second packet type, the apparatus comprising:
  a grouping mechanism arranged to group received packets of said first and second packets into an ordered series of groups, and each group containing at least one packet of any packet type, wherein the grouping mechanism is arranged to assign a group tag to each received packet, each packet within a single group being assigned the same group tag;
  a group counter indicating the number of groups at the beginning of the series of groups comprising only packets of the second packet type; and
  a transmitter arranged to transmit a packet;
  wherein a packet of the second packet type is available for transmission if but only if the group counter stores a value indicative that the number of groups at the beginning of the series of groups comprising only packets of the second packet type is greater than zero;
  wherein the grouping mechanism is arranged to assign a group tag to each received packet, each packet within a single group being assigned the same group tag; and
  wherein the group counter is arranged to change its value if a transmitted packet is of the second packet type and has a different group tag to the next packet of the second packet type.

41. An apparatus according to claim 40, wherein the group counter is arranged to change its value by the modulus of the difference between the group tag of the transmitted packet and the group tag of the next packet of the second packet type.

42. An apparatus according to claim 40, wherein the group counter is arranged to decrement its value if a transmitted packet is of the second packet type and has a different group tag to the next packet of the second packet type.

43. An apparatus for queuing data packets, said data packets comprising data packets of a first packet type and data packets of a second packet type, the apparatus comprising:
  a grouping mechanism arranged to group received packets of said first and second packets into an ordered series of groups, at least some of said groups storing both packets of said first type and packets of said second type, and each group containing at least one packet of any packet type;
  a group counter indicating the number of groups at the beginning of the series of groups comprising only packets of the second packet type; and
  a transmitter arranged to transmit a packet;
  wherein a packet of the second packet type is available for transmission if but only if the group counter stores a value indicative that the number of groups at the beginning of the series of groups comprising only packets of the second packet type is greater than zero; and
  wherein said data packets further comprise data packets of a third packet type, wherein the grouping mechanism is further arranged to group received packets into a second ordered series of groups, in which each group contains only packets of the first packet type and packets of the third packet type, the apparatus further comprising:
  a second group counter arranged to indicate the number of groups at the beginning of the second series of groups comprising only packets of the third packet type; and
  wherein a packet of the third packet type is available for transmission if but only if the second group counter stores a value indicative that the number of groups at the beginning of the second series of groups comprising only packets of the third packet type is greater than zero.

44. An apparatus according to claim 43, wherein the grouping mechanism is further arranged to group received packets into a third ordered series of groups, in which each group contains packets of the second packet type and packets of the third packet type, the apparatus further comprising:
  a third group counter arranged to indicate the number of groups at the beginning of the third series of groups comprising only packets of the third packet type;
  wherein a packet of the third packet type is available for transmission if but only if the third group counter stores a value indicative that the number of groups at the beginning of the third series of groups comprising only packets of the third packet type is greater than zero.

* * * * *